United States Patent [19]
Downing

[11] 3,727,875
[45] Apr. 17, 1973

[54] GREASELESS BAKED DONUT MOLD

[76] Inventor: John D. Downing, 3218 Jennings Street, Sioux City, Iowa 51104

[22] Filed: May 7, 1971

[21] Appl. No.: 141,200

[52] U.S. Cl. ..................249/121, 249/115, 249/125
[51] Int. Cl. ..............................................B29c 1/00
[58] Field of Search......................249/57, 134, 115, 249/119, 126, 122, 124, 144, 160, 163, 165, 170, 121, 125, 133, DIG. 1

[56] References Cited

UNITED STATES PATENTS

| | | |
|---|---|---|
| 3,638,583 | 2/1972 | Goodler et al.............................249/122 |
| 3,161,156 | 12/1964 | Batista et al. .......................249/160 X |
| 2,939,299 | 6/1960 | Sherbloom .......................249/165 X |
| 1,900,290 | 3/1933 | Kudo....................................249/57 |
| 1,476,910 | 12/1923 | Naugle ............................249/121 X |
| 2,148,079 | 2/1939 | Martin..................................249/57 |
| 3,279,936 | 10/1966 | Forestek..............................249/115 |
| 1,663,719 | 3/1928 | Morley....................................99/92 |

*Primary Examiner*—J. Spencer Overholser

[57] ABSTRACT

A device for producing donuts. This device includes a pair of members having a multiple number of depressions which when filled with the proper ingredients and placed matingly together and placed in an oven at the proper temperature, will produce donuts.

1 Claim, 3 Drawing Figures

PATENTED APR 17 1973 3,727,875

INVENTOR.
JOHN D. DOWNING

GREASELESS BAKED DONUT MOLD

This invention relates to baking utensils, and more particularly to a mold for producing donuts.

It is therefore the primary purpose of this invention to provide a mold for producing donuts which will be made of Teflon coated die-cast aluminum, a pair being used to bake donuts.

Another object of this invention is to provide a mold which will not require grease on the surfaces and will therefore enable the user to easily remove the donuts therefrom.

A further object of this invention is to provide a device of the type described which will require two units of identical configuration which will be placed matingly in engagement with each other to produce donuts.

Other objects of the present invention are to provide a greaseless baked donut mold which is simple in design, inexpensive to manufacture, rugged in construction, easy to use and efficient in operation.

These and other objects will become readily evident upon a study of the following specification together with the accompanying drawing wherein.

Figure 1:
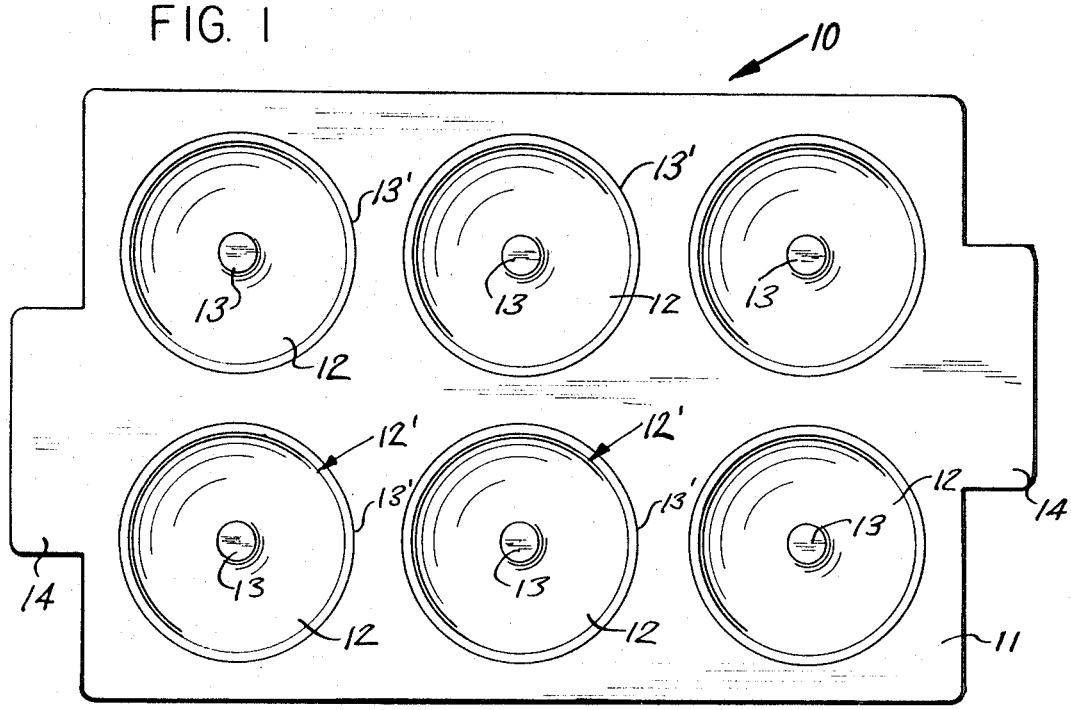
FIG. 1 is a plan view of the present invention.
Figure 2:
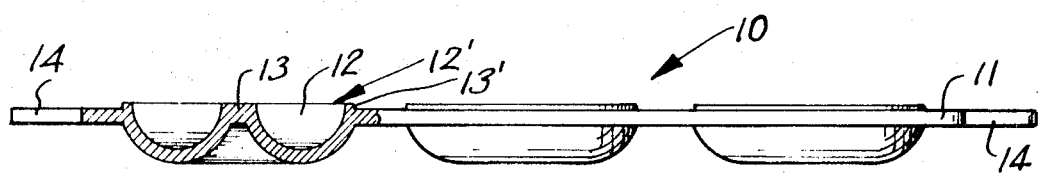
FIG. 2 is a side view of FIG. 1 shown in elevation and partly broken away.
Figure 3:
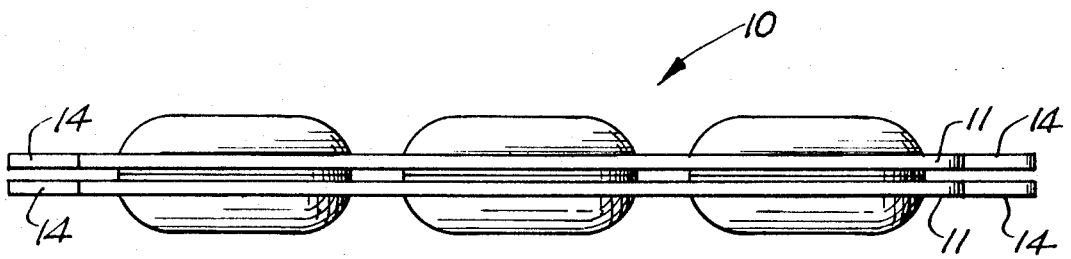
FIG. 3 is a side view of a pair of the devices of FIG. 1 shown in mating engagement with each other.

According to this invention, a greaseless, donut mold 10 is shown to include a rectangular configurated Teflon coated die-cast aluminum member 11 having a plurality of circular recessed areas 12 having an upraised center portion 13 for forming the central hole of a donut. The recessed area 12 forms compartment means 12' for receiving the mixture to be baked. In each of the recessed areas 12 a shoulder 13' extends above the top of member 11 and when a pair of members 11 are placed together with the ingredients therein, the members 14 will be spaced apart in parallel relationship with each other so as to enable the members 11 to be easily separated after the baking process.

Members 11 are also provided with handle-grip portions 14 which extend outwards of each end, each of the handle-grip portions 14 being offset from one another to allow the easy separation of the members 11 after the baking process.

After baking the donuts within members 11, the top member 11 is carefully removed and a fork is place in the center hole of the donut while the user uses a teaspoon to urge the donut onto the fork, after which the donuts are placed on a wire rack in order to let them cool before frosting and the like.

What I claim is:

1. A greaseless donut mold, comprising a pair of flat rectangular configurated Teflon coated die-cast aluminum pan members, a pair of off-set handle grip projections carried by each said pan member, a plurality of equally spaced apart recessed areas with upward raised center portions carried by said members, said members being used in pairs to produce baked donuts, said recessed portions for receiving the ingredients for producing donuts, being circular in configuration and having upraised center portion for creating the opening in a donut, shoulder means on the exterior of said recessed portions providing a means for each of said members when used in pairs to matingly engage and a butt with the opposite member, thus enabling the user to easily separate said members after the donuts are baked, each of said unit of said pair including said handle grip members, said handle grip members being offset from each other on each longitudinal end edge of said pan numbers and located along a center of said edge, thus enabling the user to easily separate said members after the baking process, said handle grips of one pan member being spaced from the handle grips of the other pan member one said pan members are positioned adjacent each other in an operative use.

* * * * *